J. L. GLOVER.
Circular-Saw Vise.
No. 224,676.  Patented Feb. 17, 1880.
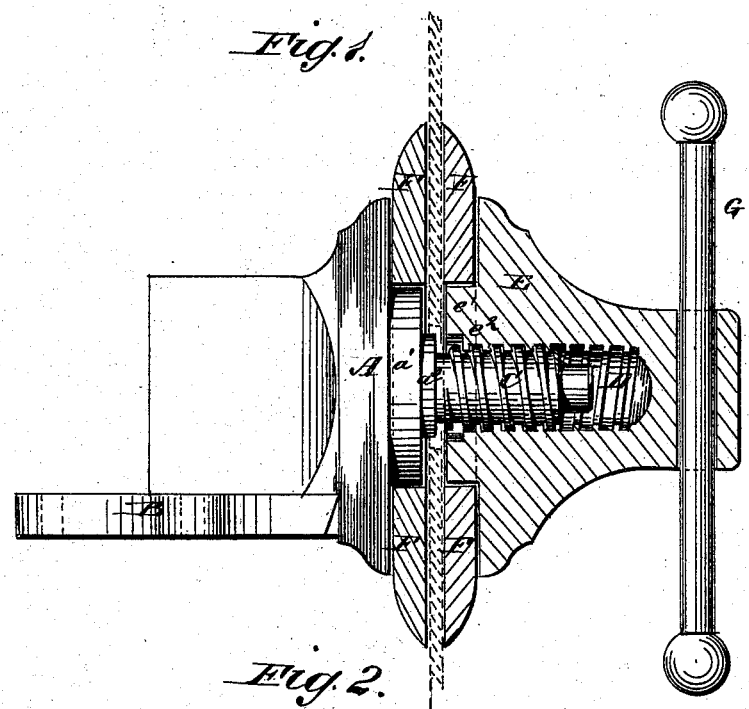
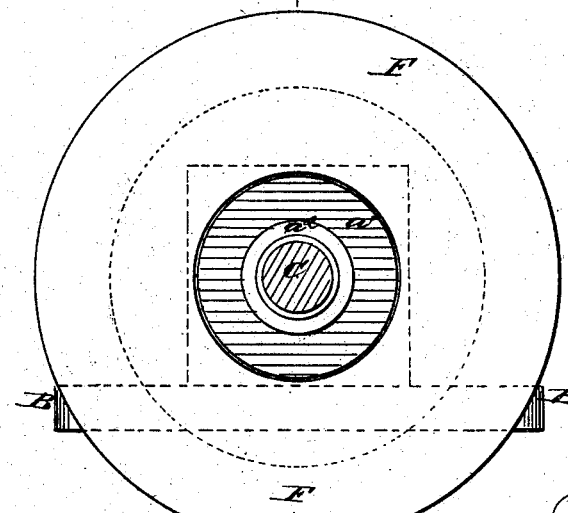
WITNESSES:
Francis McArdle.
C. Sedgwick
INVENTOR:
J. L. Glover
BY Munn & Co.
ATTORNEYS.

UNITED STATES PATENT OFFICE.

JAMES L. GLOVER, OF WINDSOR LOCKS, CONNECTICUT, ASSIGNOR TO HIMSELF AND GEORGE GLOVER, JR., OF SAME PLACE.

CIRCULAR-SAW VISE.

SPECIFICATION forming part of Letters Patent No. 224,676, dated February 17, 1880.

Application filed July 14, 1879.

*To all whom it may concern:*

Be it known that I, JAMES L. GLOVER, of Windsor Locks, in the county of Hartford and State of Connecticut, have invented a new and Improved Circular-Saw Vise of which the following is a specification.

Figure 1 is a side view of my improved vise, partly in section to show the construction. Fig. 2 is a front view of the rear jaw, the screw being shown in cross-section.

The object of this invention is to furnish an improved vise for holding circular saws while filing and upsetting their teeth, which shall be so constructed as to hold the saws firmly while being operated upon, and which shall be simple in construction and convenient in use.

The invention consists in the combination of the rear circular jaw, provided with the hub, the shoulder, and the male screw, the forward circular jaw, provided with the hub, the recess, the female screw, and the handle, and the detachable ring-flanges with each other, as hereinafter fully described.

A is the rear jaw of the vise, which is provided with a plate, B, by means of which it is secured to the bench or other support. The jaw A is made circular in form, and upon its face, and concentric therewith, is formed a circular hub, $a'$. Upon the face of the hub $a'$ is formed a circular shoulder, $a^2$, to receive the eye of the saw. C is a wrought-iron male screw, around the base of which the jaw A, hub $a'$, and shoulder $a^2$ are cast, and the threads of which fit into the threads of the female screw D, formed in the center of the forward jaw, E.

The jaw E is made circular, and upon its face is formed a hub, $e'$, corresponding with the hub $a'$ of the rear jaw, A. In the center of the face of the hub $e'$ is formed a recess, $e^2$, corresponding with the shoulder $a^2$ of the rear hub, $a'$, so that saws of various thickness may be firmly held.

F are ring-flanges, the cavities of which are made of such a size as to fit upon the hubs $a'$ $e'$ of the jaws A E, and which are made a little thicker than the hubs $a'$ $e'$, so as to clamp the saw firmly. The ring-flanges F may be made of various sizes, so that saws of different sizes may be held and operated upon in the same vise.

The middle part of the outer side of the forward jaw, E, projects, and is provided with a lever-handle, G, for convenience in screwing it on and off.

In using the vise, the jaw E is screwed off and flanges F of the proper size are placed upon the hubs $a'$ $e'$. The saw is then placed upon the shoulder $a^2$ and the jaw E is screwed on, clamping the saw securely between the flanges F and holding it firmly while being operated upon.

Having thus described my invention, what I claim as new, and desire to secure by Letters Patent, is—

The combination of the circular jaw A, provided with the hub $a'$, the shoulder $a^2$, and the male screw C, the circular jaw E, provided with the hub $e'$, the recess $e^2$, the female screw D, and the handle G, and the ring-flanges F with each other, substantially as herein shown and described.

JAMES L. GLOVER.

Witnesses:
SIMON B. DOUGLAS,
MARTIN J. SURREY.